United States Patent Office 2,824,889
Patented Feb. 25, 1958

2,824,889

SATURATED ALIPHATIC TRICARBOXYLIC ACID ESTERS

Herman A. Bruson and John D. Newkirk, New Haven, Conn., assignors to Olin Mathieson Chemical Corporation, New Haven, Conn., a corporation of Virginia No Drawing. Application June 21, 1955
Serial No. 517,068

8 Claims. (Cl. 260—485)

This invention relates to aliphatic esters, and has for its object the provision of certain saturated aliphatic tricarboxylic acid esters and a process of producing them. The new compounds of the invention may be represented by the formula:

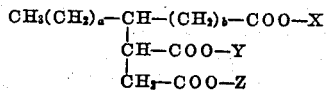

wherein $a$ is an integer from 6 to 9 inclusive, $b$ is equal to $(15-a)$; and X, Y, and Z are each members of the group consisting of alkyl and alkyl-$(O-A)_n$- radicals, wherein A is a alkylene group having from 2 to 3 carbon atoms, and $n$ is an integer from 1 to 3 inclusive; the sum of the carbon atoms in X, Y, and Z together being not less than 6 nor more than 81.

The esters of the invention have a low pour point or freeze point, a favorable viscosity index, an extremely low vapor pressure at elevated temperatures, and have good resistance to autoxidation and hydrolysis. The esters can be prepared economically from natural olefinic fatty acids, notably oleic acid, and are, accordingly, relatively inexpensive. Because of their peculiar combination of physical and chemical properties and their relatively low production costs, the esters of the invention are effective and practical lubricants.

In the process of the invention the new esters may be obtained advantageously by hydrogenation of the unsaturated adducts that are formed from the appropriately esterified condensation products of maleic anhydride and oleic acid, or by trans-esterification of a saturated lower alkyl ester of such adducts.

The new esters prepared especially for use as lubricants should preferably be free of acidity and of excess alcohols used in the esterification. Their olefinic unsaturation must be completely saturated by hydrogenation; otherwise, they may undergo autoxidation which accelerates the formation of deleterious acids that lead to corrosion of the metal surfaces being lubricated. By suitable choice of the monovalent radicals X-, Y-, and Z-, these new esters can be obtained with extremely low pour points and high viscosity indexes, possessing excellent lubricant properties.

In preparing the new esters in accordance with the process of the invention an appropriate monohydric alcohol X-OH is advantageously esterified with oleic acid or elaidic acid to furnish the starting material having essentially the formula:

$$CH_3(CH_2)_7—CH=CH(CH_2)_7—COO-X$$

wherein X is the organic group of the alcohol used.

This ester is then reacted with one molecular equivalent of maleic anhydride at from about 200° to 250° C., preferably in an inert atmosphere, to effect the formation of a mixture of four isomeric adducts, namely:

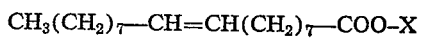

1. $CH_3(CH_2)_6—CH—CH=CH(CH_2)_7—COO-X$
     |
     R

2. $CH_3(CH_2)_7—CH—CH=CH(CH_2)_6—COO-X$
     |
     R

3. $CH_3(CH_2)_6—CH=CH—CH(CH_2)_7—COOX$
                          |
                          R

4. $CH_3(CH_2)_7—CH=CH—CH(CH_2)_6—COOX$
                          |
                          R with R indicating the radical:

Alternatively, maleic anhydride or maleic acid can be condensed with free oleic acid or elaidic acid in the same manner.

The mixture of acid anhydrides thus obtained is then esterified with the appropriate monohydric alcohol Y—OH or a mixture of monohydric alcohols Y—OH and Z—OH to give a mixture of the corresponding unsaturated triesters (1) to (4) above, wherein R represents the radical:

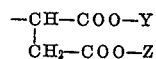

Finally, the above mixture of unsaturated triesters is subjected to catalytic hydrogenation in order to saturate the residual olefinic linkages. Any unchanged materials or volatile by-products including free alcohols, oleates, maleates, stearates, etc., are removed by vacuum distillation either prior to or after the hydrogenation step. Hydrogenation is advantageously carried out with a finely divided nickel catalyst such as Raney nickel at elevated temperature and pressures, of the order of 150–200° C. and 50 to 200 atmospheres hydrogen pressure. The residual oil is then treated to remove free acidity and traces of alcohols, advantageously by washing with dilute alkali followed by the use of aluminum oxide or absorbent clays.

In many instances, it is advantageous to prepare the desired ester by transesterifying a triester as above of a lower alkanol, such as of methanol, ethanol, propanol or isopropanol. The transesterification can be effected by known methods, by adding the higher alcohol or a mixture of higher alcohols to the triester, heating in the presence of a suitable catalyst such as sulfuric acid, alkali metal hydride or alcoholate, or other transesterification catalyst, and removing the lower alkanol by distillation.

The purified materials thus obtained are pale yellow to amber colored oils of extremely low vapor pressure and low pour point, having good lubricating properties and favorable viscosity characteristics. Many of them remain fluid at temperatures below —65° Fahrenheit, and all of them possess a viscosity index higher than 100 (Dean-Davis).

In practicing this invention, the alcohols X—OH, Y—OH, and Z—OH employed can be the same or different monohydric saturated aliphatic alcohols such as ethyl, propyl, isopropyl, or any of the isomeric butyl, amyl, hexyl, heptyl, octyl, nonyl, decyl, dodecyl, tridecyl, tetradecyl, hexadecyl, and octadecyl alcohols or the corresponding ether alcohols obtained by reacting the foregoing alcohols with from 1 to 3 moles of ethylene oxide or propylene oxide.

Typical ether alcohols, alkyl-$(O-A)_n$-OH, of this type, are 2-methoxyethanol, 2-ethoxyethanol, 2-isopropoxyethanol, 2-n-butoxyethanol, 2-(methoxyethoxy) ethanol, 2-(ethoxyethoxy) ethanol, 2-(butoxyethoxy) ethanol, 2-(methoxyethoxyethoxy) ethanol, Butyl—O—$CH_2CH_2$—O—$CH_2CH_2$—O—$CH_2CH_2OH$
Iso-amyl—O—$CH_2CH_2$-O-$CH_2CH_2$-O-$CH_2CH_2OH$
$C_2H_5$—O—$CH(CH_3)CH_2OH$ and

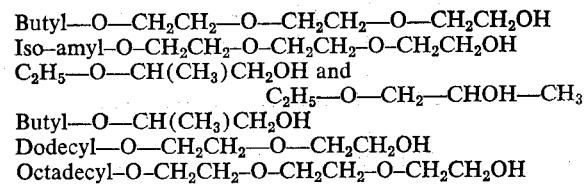

Butyl—O—$CH(CH_3)CH_2OH$
Dodecyl—O—$CH_2CH_2$—O—$CH_2CH_2OH$
Octadecyl-O-$CH_2CH_2$-O-$CH_2CH_2$-O-$CH_2CH_2OH$ and their homologues.

These alcohols must be so selected that in the triesters of this invention, the sum of the carbon atoms in radicals X, Y, and Z together is not less than 6 and not more than 81. Esters having less than a total of 6 carbon atoms in radicals X, Y, and Z together, show either mediocre viscosity characteristics, ease of hydrolysis, or excessive volatility at elevated temperatures.

For example, the trimethyl ester wherein X, Y, and Z are each methyl groups (and consequently $X+Y+Z=3$ carbon atoms) is not only volatile, but possesses a very poor viscosity index, namely 54 in contrast to a viscosity index of over 100 shown by the esters of this invention wherein the sum of carbon atoms in X, Y, and Z totals at least six.

When the carbon content of $X+Y+Z$ exceeds 81, the esters tend to solidify at $+10°$ to $-20°$ F. and are consequently not suitable for use at very low temperatures unless diluted with other esters to depress their freeze point.

Of particular value as lubricants are those esters of this invention wherein at least one of the groups X, Y, or Z is the organic radical of an ether alcohol, alkyl-$(O-A)_nOH$, wherein $n=1$, 2 or 3; and A is an alkylene group of 2 to 3 carbon atoms. Such esters are especially advantageous as lubricants, as they present especially favorable properties, and in particular, excellent combinations of desirable viscosity index, low pour point and lubricity.

In actual use in internal combustion engines, such as automotive engines, the lubricants of this invention are advantageously mixed with from 0.01% to 0.5% by weight of an antioxidant such as, for example, phenothiazine. Other additives may also be added to these esters, such as are customarily employed in hydrocarbon lubricating oils, for example viscosity index improvers notably polylauryl methacrylate, or various oil-soluble detergents, extreme pressure agents such as chlorinated waxes and oils, phosphorized and sulfurized oils, and organic phosphates or phosphites.

The esters described herein may also be used for greases by compounding with gelling agents such as lithium hydroxystearate or bentonite.

The following examples illustrate processes according to this invention:

Example 1

A mixture of 502 g. oleic acid (technical grade) and 193 g. of maleic anhydride was heated with stirring in an atmosphere of nitrogen for one hour at 200–220° C. and then for three hours at 220–230° C. The crude reaction product was refluxed with 300 g. of anhydrous ethyl alcohol containing 5 cc. of concentrated sulfuric acid; continuously removing the water formed as an azeotrope with toluene, in an automatic water separator. The crude mixture of ethyl esters formed was taken up in ether, washed with water, sodium bicarbonate or potassium carbonate solution, then water, and dried over anhydrous sodium sulfate. The ether was distilled off and the residual unsaturated ester was hydrogenated over 4 g. of Raney nickel catalyst at 180–210° C. and 1800–2800 lbs. per sq. in hydrogen pressure for 8 hours. The hydrogenated product was filtered and distilled under reduced pressure to remove ethyl succinate and ethyl stearate. The desired saturated triethyl ester of Formula I wherein X, Y, and Z are each ethyl groups, distilled over at 200–210° C. (0.2 mm. Hg pressure) as a colorless, odorless liquid. Yield 300 g.

This ester possesses a pour point of —65° F. and a viscosity index of 116 as determined by the method of Dean and Davis (ASTM method D567-41).

Example 2

A mixture of 310 g. ethyl oleate and 98 g. of maleic anhydride was heated with stirring in an atmosphere of nitrogen for one hour at 200–220° C. and then for three hours at 220–230° C. The resulting product was cooled to 100° C. and to it was added slowly 175 g. of anhydrous ethyl alcohol containing 3.5 cc. of concentrated sulfuric acid. The mixture was boiled under reflux for three hours, then 70 cc. of heptane was added, and refluxing was continued using an automatic water separator to remove the water formed by the esterification. When no more water came over, the mixture was cooled, diluted with twice its volume of ether, and washed successively with water, sodium bicarbonate and potassium carbonate solutions, finally again with water and then dried over anhydrous sodium sulfate. The solvents were removed by distillation and the residual oil was distilled in an atmosphere of nitrogen under reduced pressure. The triethyl ester of the unsaturated adduct of maleic anhydride-ethyl oleate was thus obtained as a nearly colorless oil (yield 175 g.) boiling at 200–210° C. at 0.15 mm. It analyzed as follows:

Acid number: Found 0; calc'd 0.
Saponification number: Found 330; calc'd. 349.
Iodine value: Found 57.0; calc'd. 52.6.

Upon catalytic hydrogenation, it yields the same saturated triethyl ester as described in Example 1; showing a pour point of —65° F. and a viscosity index 116 by the Dean and Davis method.

Example 3

A mixture of 204 g. 2-ethylhexanol, 0.5 cc. concentrated sulfuric acid, 75 cc. of toluene and 60 g. of the saturated triethyl ester described in Example 1 was refluxed under an efficient column, and the toluene-ethanol azeotrope removed as fast as ethanol was formed by the alcoholysis reaction. When no more ethanol came over, the toluene and excess 2-ethylhexanol were removed by distillation. The residual oil was stirred with 5 g. of calcium hydroxide, filtered, diluted with twice its volume of hexane and percolated slowly through a column of activated alumina to remove impurities. The eluted solution was filtered and the hexane was stripped off to give 55 g. of light yellow oil corresponding to Formula I wherein X, Y, and Z are each 2-ethylhexyl radicals. This oil possessed a viscosity index of 125 and a pour point of —65° F.

The following table shows the effect of the radicals X, Y, and Z upon the physical properties of the saturated triester lubricants of this invention. These compounds were prepared as described in Example 3.

| X, Y, Z | Kinematic Viscosity Centistokes at— | | Dean and Davis Viscosity Index | Pour Point, °F. |
|---|---|---|---|---|
| | 100° F. | 210° F. | | |
| Ethyl | 31.80 | 5.40 | 116 | −65 |
| n-Propyl | 28.00 | 5.23 | 131 | −70 |
| Iso-Propyl | 26.48 | 4.88 | 120 | −50 |
| n-Butyl | 29.06 | 5.50 | 137 | −65 |
| Iso-Butyl | 37.60 | 6.06 | 116 | −55 |
| Sec-Butyl | 29.73 | 5.26 | 121 | −65 |
| n-Amyl | 32.60 | 6.06 | 138 | −60 |
| Iso-Amyl | 38.96 | 6.48 | 126 | −65 |
| Sec-Amyl | 31.72 | 5.53 | 123 | −65 |
| n-Hexyl | 31.79 | 6.38 | 151 | −65 |
| 2-ethylbutyl | 44.31 | 7.13 | 139 | −65 |
| n-Octyl | 37.26 | 6.87 | 143 | −45 |
| 2-ethylhexyl | 50.60 | 7.80 | 125 | −65 |
| Iso-Octyl* | 44.98 | 7.92 | 141 | −65 |
| 2-octyl | 45.00 | 7.12 | 124 | −65 |
| Iso-Decyl* | 52.97 | 8.17 | 127 | −60 |
| Iso-Tridecyl* | 88.72 | 11.05 | 116 | −40 |
| n-Hexyl—O—C₂H₄—O—C₂H₄— | 46.04 | 8.03 | 140 | −55 |
| n-Hexyl—O—CH₂CH₂— | 39.30 | 7.08 | 140 | −60 |
| CH₃—O—CH₂CH₂— | 34.66 | 5.98 | 128 | −45 |
| C₂H₅—O—CH₂CH₂— | 33.77 | 5.96 | 130 | −55 |
| n-C₄H₉—O—CH₂CH₂— | 36.37 | 6.66 | 140 | −65 |
| n-C₄H₉—O—C₂H₄—O—C₂H₄— | 42.43 | 7.69 | 143 | −65 |
| CH₃—O—CH₂CH₂—O—CH₂CH₂— | 41.96 | 7.26 | 136 | −55 |

*Derived from alcohols made by the Oxo reaction of carbon monoxide and hydrogen with olefines, and sold by Standard Oil Company of Indiana.

The esters listed in the foregoing table have vapor pressures less than about 0.1 mm. Hg at 200° C. excepting the triethyl ester which has a vapor pressure of about 0.2 mm. Hg at 200°–210° C.

The following illustrates the preparation of esters in accordance with this invention, wherein X, Y, and Z are different monovalent hydrocarbon radicals.

*Example 4*

A mixture of 18.5 g. n-butanol, 39 g. of 2(n-hexyloxy) ethanol, 121 g. of the saturated triethyl ester described in Example 1, 350 cc. toluene and 1 cc. of concentrated sulfuric acid was boiled under a reflux condenser attached to a water trap, removing by vaporization two equivalents of ethanol as an azeotrope with the toluene.

When no more ethanol distilled off, the reaction mixture was cooled, washed with water and potassium carbonate solution, dried over anhydrous sodium sulfate and stripped of excess toluene.

The product was diluted with two volumes of hexane and run slowly through a column of activated alumina to remove impurities. After distilling off the hexane, the product obtained was a light yellow oil corresponding to Formula I wherein X, Y, and Z are three different aliphatic radicals, consisting of ethyl, n-butyl, and n-hexyl-oxyethyl.

This oil possessed the following properties:

Kinematic viscosity 100° F _____ centistokes __ 35.08
Kinematic viscosity 210° F _____ do ____ 6.35
Viscosity index _____ 137
Pour point _____ °F __ −70

*Example 5*

A mixture of 97 g. of the saturated triethyl ester described in Example 1, 52 g. of iso-octyl alcohol, 1 cc. of concentrated sulfuric acid and 400 cc. of toluene was boiled under a reflux condenser attached to a water trap, removing by vaporization two equivalents of ethanol as an azeotrope with the toluene.

The mixed ester, containing ethyl and iso-octyl groups attached to the carboxyl groups, was subjected to the purification procedure described in Example 4. It was found to have the following properties:

Kinematic viscosity 100° F _____ centistokes __ 46.88
Kinematic viscosity 210° F _____ do ____ 7.58
Viscosity index _____ 130
Pour point _____ °F __ −60

We claim:
1. An ester having the formula

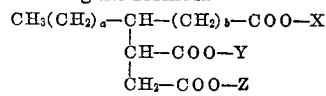

wherein $a$ is an integer from 6 to 9 inclusive, $b$ is equal to $(15-a)$; and X, Y, and Z are chosen from the group consisting of alkyl and alkyl-$(O—A)_n$-radicals wherein A is an alkylene group having 2 to 3 carbon atoms, and $n$ is an integer from 1 to 3 inclusive; the sum of carbon atoms in X, Y, and Z being not less than 6 nor more than 81; said ester having a pour point at least as low as −40°.

2. An ester as defined in claim 1 having a pour point of −65° F. and a viscosity index over 100.

3. An ester having the formula

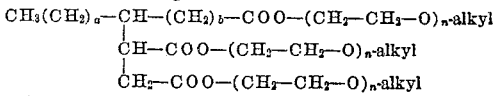

wherein $a$ is an integer from 6 to 9 inclusive, $b$ is equal to $(15-a)$; and $n$ is an integer from 1 to 3 inclusive; the sum of carbon atoms in the three —(CH₂—CH₂—O)ₙ-alkyl groups being less than 82; said ester having a pour point at least as low as −40°.

4. An ester having the formula

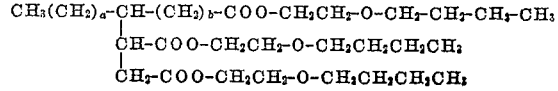

wherein $a$ is an integer from 6 to 9 inclusive and $b$ is equal to $(15-a)$; said ester having a pour point at least as low as $-40°$.

5. An ester having the formula

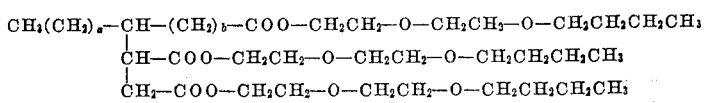

wherein $a$ is an integer from 6 to 9 inclusive and $b$ is equal to $(15-a)$; said ester having a pour point at least as low as $-40°$.

6. An ester having the formula

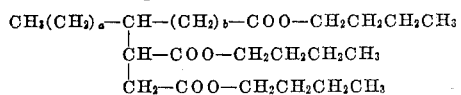

wherein $a$ is an integer from 6 to 9 inclusive and $b$ is equal to $(15-a)$; said ester having a pour point at least as low as $-40°$.

7. An ester having the formula

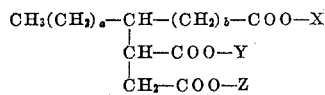

wherein $a$ is an integer from 6 to 9 inclusive and $b$ is equal to $(15-a)$; X, Y, and Z are chosen from the group consisting of alkyl and alkyl-$(O-A)_n$-radicals wherein A is an alkylene group having 2 to 3 carbon atoms, and $n$ is an integer from 1 to 3 inclusive; at least one of X, Y, and Z being an alkyl-$(O-A)_n$-radical as above defined; and the sum of the carbon atoms in X, Y, and Z being not less than 6 nor more than 81; said ester having a pour point at least as low as $-40°$.

8. An ester having the formula

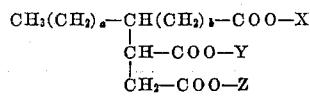

wherein $a$ is an integer from 6 to 9 inclusive, $b$ is equal to $(15-a)$, and X, Y, and Z are alkyl groups having a total of not less than 6 nor more than 81 carbon atoms; said ester having a pour point at least as low as $-40°$.

References Cited in the file of this patent

UNITED STATES PATENTS 2,510,915 Spurlin _____ June 6, 1950
2,569,420 Kosmin _____ Sept. 25, 1951

OTHER REFERENCES

Bickford et al.: J. Am. Oil Chem. Soc., July 1948, pp. 254–7.